(12) United States Patent
Niemelä

(10) Patent No.: US 6,865,396 B2
(45) Date of Patent: Mar. 8, 2005

(54) SYSTEM AND METHOD OF POWER CONTROL USING A MODULATED SIGNAL

(75) Inventor: Kari Niemelä, Oulu (FI)

(73) Assignee: Nokia Corporation, Espoo (FI)

( * ) Notice: Subject to any disclaimer, the term of this patent is extended or adjusted under 35 U.S.C. 154(b) by 107 days.

(21) Appl. No.: 09/864,534

(22) Filed: May 24, 2001

(65) Prior Publication Data

US 2002/0009981 A1 Jan. 24, 2002

Related U.S. Application Data

(63) Continuation of application No. PCT/FI99/00976, filed on Nov. 25, 1999.

(30) Foreign Application Priority Data

Nov. 26, 1998 (FI) .................................................. 982561

(51) Int. Cl.$^7$ ................................................ H04Q 7/20
(52) U.S. Cl. ...................... 455/522; 455/69; 455/127.1; 370/318
(58) Field of Search ............................... 455/115.1, 116, 455/126–127.1, 422, 522, 69; 330/127, 129, 279; 370/333, 311, 318, 332

(56) References Cited

U.S. PATENT DOCUMENTS

| 5,128,629 A | * | 7/1992 | Trinh ........................... 330/129 |
| 5,193,223 A | * | 3/1993 | Walczak et al. .......... 455/115.1 |
| 5,369,789 A | | 11/1994 | Kosugi et al. |
| 5,408,197 A | | 4/1995 | Miyake |
| 5,564,092 A | | 10/1996 | Grandfield et al. |
| 5,598,126 A | * | 1/1997 | Dekker ......................... 330/129 |
| 5,625,647 A | * | 4/1997 | Kawasaki .................... 375/295 |
| 5,675,611 A | | 10/1997 | Lehtinen et al. |
| 5,732,334 A | * | 3/1998 | Miyake ........................ 455/126 |
| 5,740,524 A | | 4/1998 | Pace et al. |
| 5,745,840 A | | 4/1998 | Gordon |
| 5,826,177 A | | 10/1998 | Uno |
| 5,963,087 A | * | 10/1999 | Anderson ................. 455/237.1 |

FOREIGN PATENT DOCUMENTS

| EP | 0 558 210 | | 9/1993 |
| EP | 0 705 010 | | 4/1996 |
| EP | 0 765 042 | | 3/1997 |
| EP | 0 800 267 | | 10/1997 |
| GB | 2329560 | * | 3/1999 |
| JP | 08032384 | | 2/1996 |
| WO | WO 98/52298 | * | 11/1998 |

* cited by examiner

Primary Examiner—Tilahun Gesesse
(74) Attorney, Agent, or Firm—Squire, Sanders & Dempsey L.L.P.

(57) ABSTRACT

The invention relates to a power control method and a power control system used in a transmitter of a radio system comprising an amplifier means and a modulation means, which modulates a signal to be transmitted to the radio path. The control system also comprises a control means, which forms an amplification control signal used to adjust the transmission power of the signal to be transmitted to the radio path. The control system further comprises a means which forms a reference signal following the changes in the envelope of the modulated signal, and a means which samples the amplified signal in order to form a sample signal. The control means forms a control signal, which adjusts the amplification of the amplifier means, from the reference signal and the sample signal.

17 Claims, 3 Drawing Sheets

SYSTEM AND METHOD OF POWER CONTROL USING A MODULATED SIGNAL

This is a continuation of Application No. PCT/FI99/00976, Nov. 25, 1999.

FIELD OF THE INVENTION

The invention relates to a power control method used in a radio system where a modulated signal is transmitted to the radio path, in which method the transmission power of the signal to be transmitted is adjusted with an amplification control signal.

BACKGROUND OF THE INVENTION

In radio systems, the quality of a connection between a base station and a subscriber terminal varies constantly due to attenuation and multipath propagation of radiowaves. The attenuation of a signal between a base station and a subscriber terminal is represented by the attenuation on the transmission path, which increases at least quadratically with a growing distance.

An object of power control in a radio system is to enable the base station to receive signals with optimum power levels from the radio path. Another object of power control is to ensure that a subscriber terminal receives from the base station signals which have optimum power levels upon reception.

Prior art base stations and subscriber terminals employ different power control methods. The methods used in linear modulations are not usually optimum due to envelope variations related to the modulation. For example, a power control method utilizing a closed power control loop causes amplitude distortion in the signal to be transmitted, since the signal amplitude is dependent on the transmitted information. Therefore, a problem with prior art transceivers is that the power control loop tends to change the modulated signal that contains information, which possibly leads to loss of information.

BRIEF DESCRIPTION OF THE INVENTION

An object of the invention is to provide a method and equipment implementing the method so as to solve the aforementioned problems. This is achieved with a method of the type described in the introduction, characterized by forming a reference signal, which follows the changes in the envelope of the modulated signal, sampling the amplified signal to form a sample signal, and forming an amplification control signal from the reference signal and the sample signal.

The invention also relates to a power control system used in a transmitter of a radio system comprising an amplifier means and a modulation means, which modulates a signal to be transmitted to the radio path, and a control means, which forms an amplification control signal used to adjust the transmission power of the signal to be transmitted to the radio path.

The power control system according to the invention is characterized in that the control system comprises a means which forms a reference signal following the changes in the envelope of the modulated signal, and a means which samples the amplified signal in order to form a sample signal, and that the control means forms a control signal, which adjusts the amplification of the amplifier means, from the reference signal and the sample signal.

The preferred embodiments of the invention are disclosed in the dependent claims.

The invention is based on the operation of the power amplifier being controlled by a control signal, the strength of which depends on the envelope of the modulating signal.

The method and the power control system according to the invention provide several advantages. If a transmitter using the power control system employs a linear modulation method, the invention enables the use of a relatively fast power control loop in the power control system, which is necessary to form a TDMA transmission pulse, for example. The method also enables minimization of the amplitude distortion from the output signal of the transmitter. The inventive elements of the power control system can be implemented rather easily, for example, by means of an ASIC. The performance of the power control system according to the invention can also be optimized by controlling the transmission power in an open loop comprising a voltage variable attenuator that is controlled according to a desired average power.

BRIEF DESCRIPTION OF THE FIGURES

The invention will be described below in greater detail in connection with the preferred embodiments and with reference to the accompanying drawings, in which.

DETAILED DESCRIPTION OF THE INVENTION

Figure 1:
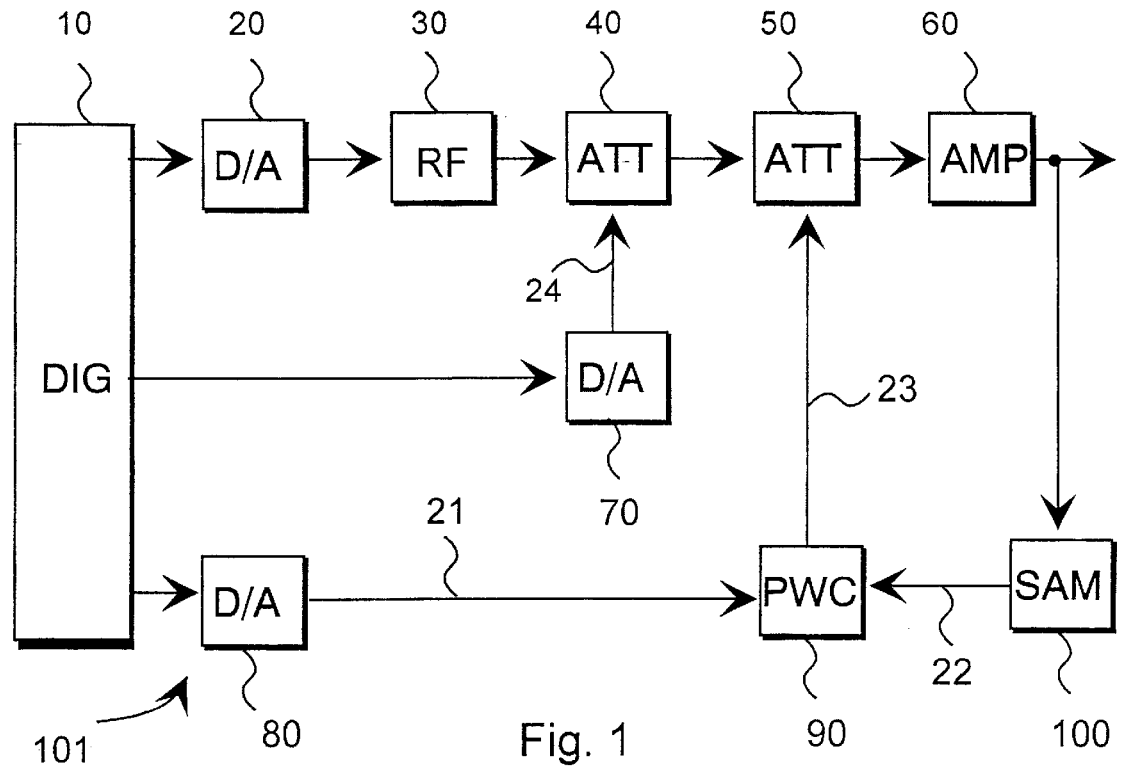
FIG. 1 shows a transmitter comprising a power control system according to the invention.

FIG. 1 shows a transmitter 101 comprising a means 10, a converter means 20, a means 30, a first attenuator means 40, a second attenuator means 50, an amplifier means 60, a converter means 70, a converter means 80, a control means 90 and a sampling means 100. The transmitter 101 utilizes the power control method according to the invention. The first and the second attenuator means can be implemented, for example, by means of a voltage variable attenuator. The amplifier means 60 is in practice a power amplifier, which amplifies a signal to be transmitted to the radio path to a suitable power level. The signals to be transmitted to the radio path are typically signal bursts. The means 10 provided in the transmitter is preferably implemented by digital components.

The converter means 20, 70, 80 convert digital signals arriving from the means 10 into an analog signal. The DA converter means 20, 70, 80 can also be provided in the means 10, for example. In the arrangement shown in FIG. 1, the means 30 up-converts a received signal into an RF signal. The means 30 can also operate as a modulator. The up-converted signal is supplied to the first attenuator means 40, which attenuates the signal. The means 10 forms an open loop power control signal 24 to control the first attenuator means 40. The control signal 24 rises before the actual burst. Correspondingly, the control signal 24 falls after the actual burst.

The control means 90 forms an amplification control signal 23, which controls the second attenuator means 50. An output signal of the second attenuator means 50 is supplied as an input signal to the power amplifier. The strength of the control signal 23 therefore affects the strength of the signal obtained from the output of the power amplifier.

The means 10 forms a reference signal 21 that is used to adjust the amplifier means 60. The adjusting affects the strength of the output signal of the amplifier means. The output side of the amplifier means 60 is connected to the sampling means 100, which samples the signal amplified by the amplifier means. The signal samples are proportional to the amplitude of the transmitted signal. The reference signal is supplied to the control means 90, which receives a sample signal 22 from the sampling means 100.

The means 100 can be implemented by a directional coupler, for example. The means 100 can also linearize the signal samples it has taken. The sample signal 22 formed by the means 100 comprises data about the strength of the signal amplified by the amplifier means 60. The means 90 operates as an integrator in the transmitter shown in the figure. The control means 90 forms an amplification control signal 23 from the reference signal 21 and the sample signal 22, the control signal being used by the transmitter to control the amplification of the amplifier means.

Figure 2:
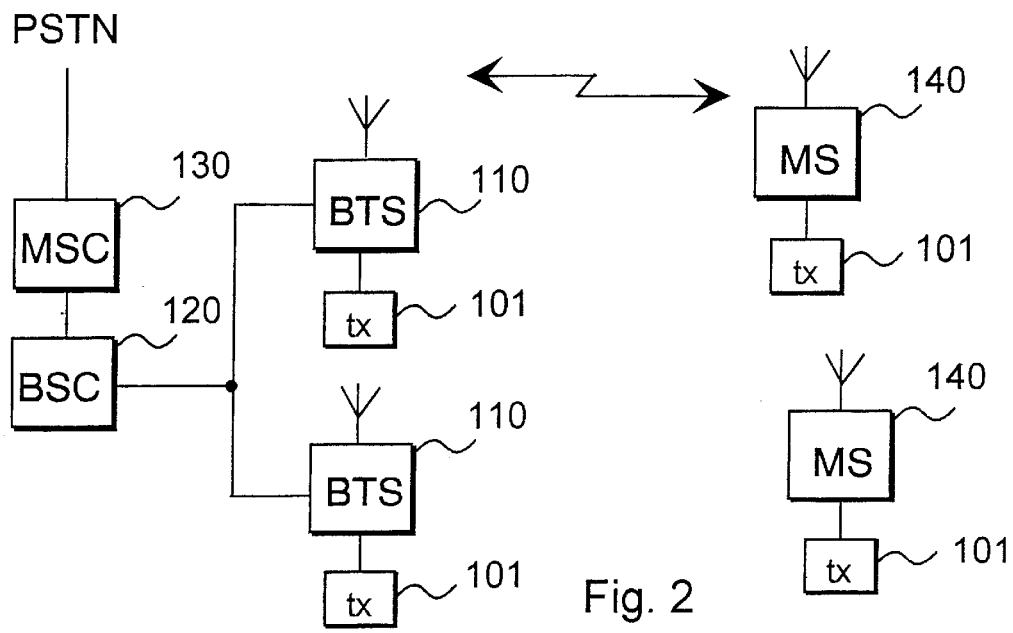
FIG. 2 shows a radio system comprising transmitters utilizing the power control method according to the invention.

FIG. 2 shows a radio system comprising base stations 110, a base station controller 120, a mobile services switching centre 130 and subscriber terminals 140. The subscriber terminals can be, for example, mobile phones. The figure shows that each subscriber terminal 140 and base station 110 comprises a transmitter 101 utilizing the power control method according to the invention.

Figure 3:
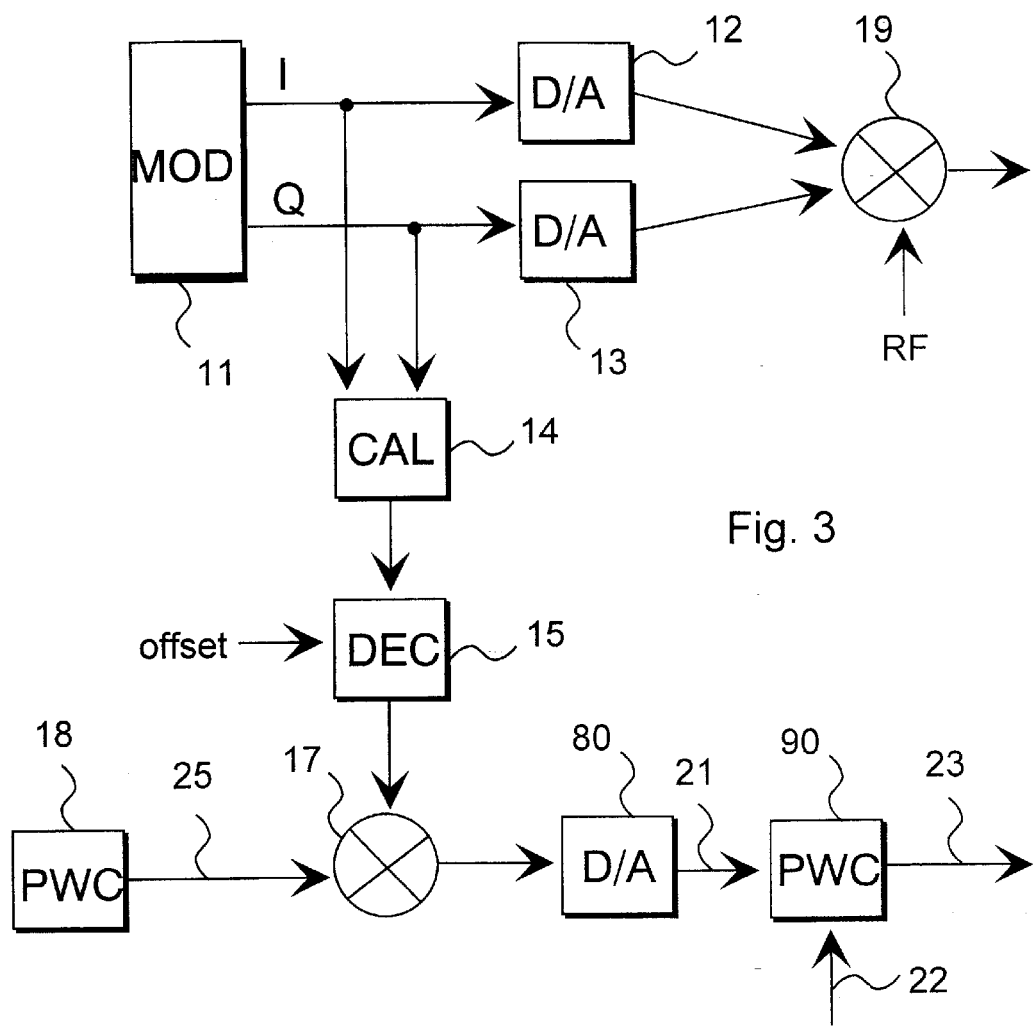
FIG. 3 shows the power control system in more detail.

FIG. 3 shows the power control system in more detail. The system shown in the figure comprises a modulation means 11, converter means 12, 13, 80, a calculation means 14, a means 15, a means 17, a means 18, a means 19 and a control means 90. The modulation means 11 forms I and Q signals, which are supplied to the calculation means 14. The I and Q signals are also supplied to the converter means 12, 13, which convert the received signals into an analog form. The analog signals are supplied to the means 19, which also receives an RF signal. The means 19 is, for example, a quadrature modulator. The calculation means 14 applies, for example, the following formula to the signals it has received:

$$A(t) = \sqrt{(I(t)^2 + Q(t)^2)} \quad (1)$$

I(t) and Q(t) denoted in the above formula are quadrature components of the modulated signal. A(t) is the normalized amplitude corresponding to the quadrature components. The means 14 forms the envelope of the received signals on the basis of formula (1). A signal containing an envelope is supplied from the means 15 to the means 17, which also receives a power control signal 25 from the means 18. The means 17 multiplies the envelope signal and the power control signal 25 together according to formula (2).

$$U_{epc}(t) = A(t) * U_{pc}(t) \quad (2)$$

Upc in formula (2) denotes an average voltage controlling the signal power, and Uepc denotes a reference signal. More precisely, the means 17 forms a reference signal by multiplying together the envelope of the modulated signal and the power control signal supplied from the means 18. The transmitter can also utilize signal values produced by the converter means 12, 13 to form the envelope.

The amplitude of the reference signal formed by the means 17 tends to change towards the amplitude variations occurring in the envelope of the modulated signal. The means 17 preferably forms the reference signal by digital multiplication. The reference signal is converted into an analog signal in the means 80. The reference signal 21 obtained from the means 80 is supplied to the control means 90, which forms an amplification control signal 23. Since the reference signal 21 combines the envelope of the modulating signal and the power control signal corresponding to the desired average power, the power of the transmitter can be controlled by means of a closed control loop. A closed power control loop is formed when the output signal of the amplifier means is sampled and the samples are used to adjust the control signal of the amplifier means.

With reference to FIG. 1, the reference signal 21 received by the control means 90, which comprises the envelope of the modulated signal, and the sample signal 22 supplied from the means 100 are used to form an amplification control signal 23 in the control means 90. The control signal 23 is used to adjust the strength of the signal obtained from the output of the amplifier means 60.

Figure 4:
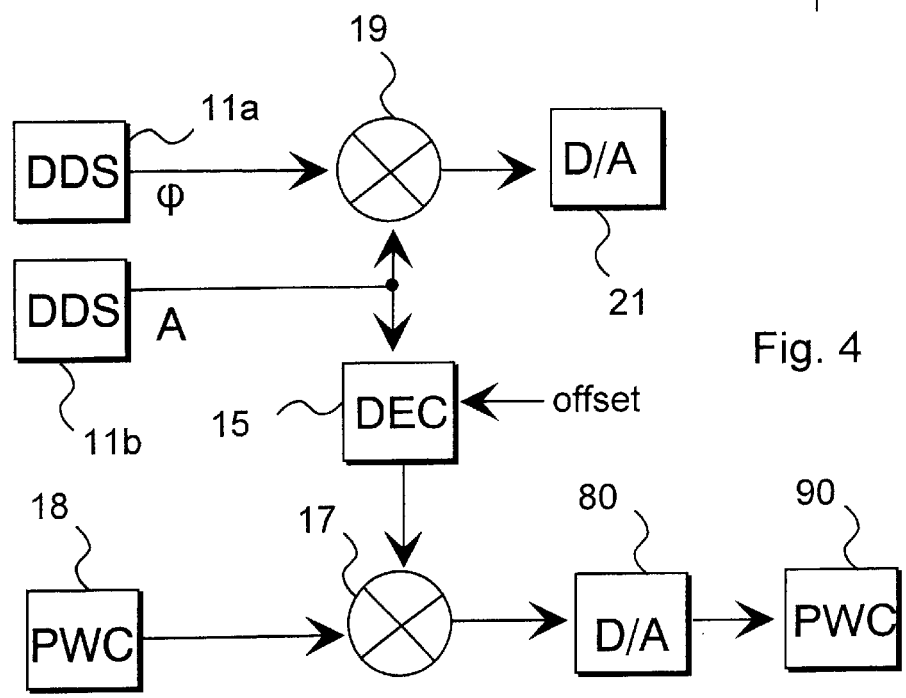
FIG. 4 shows the power control system in more detail.

FIG. 4 shows the power control system in more detail. The system shown in FIG. 4 is used in a transmitter comprising modulation means 11a, 1b, a means 15, a means 17, a means 18, a means 19, converter means 20, 80, and a control means 90. The modulation means 11 apply, for example, the DDS method in the modulation. The modulation means 11a forms a signal that is proportional to the frequency. The modulation means 11b, in turn, forms a signal that is proportional to the amplitude. The signals formed by the modulation means are supplied to the means 19, which multiplies or combines the received signals in some other corresponding manner. The modulation means 11 and the means 15 form a polar modulator. The means 19 forms a modulating signal, which is supplied to the converter means 20.

The signal formed by the modulation means 11b is supplied to the means 15, which subjects the received signal to decimation, for example. The means 15 also uses the received offset signal to ensure that the point of decimation is at the correct location. The means 15 delays the signal supplied from the means 14 (FIG. 3) or the means 11b, such that the timing difference between the signals in the inputs of the means 90 is as short as possible. The signal formed by the means 15 is supplied to the means 17, which also receives a power control signal from the means 18. The means 15 multiplies the received signals together. The means 15 can also combine the received signal in a manner corresponding to multiplication. The signal formed by the means 15 is used as a reference signal, which is converted into an analog form in the converter means 80. The analog signal is supplied from the converter means 80 to the control means 90. The changes in the amplitude of the reference signal can correspond to the changes in the amplitude of the modulated signal obtained from the output of the modulator formed by the modulation means 11 and the means 19.

Figure 5:
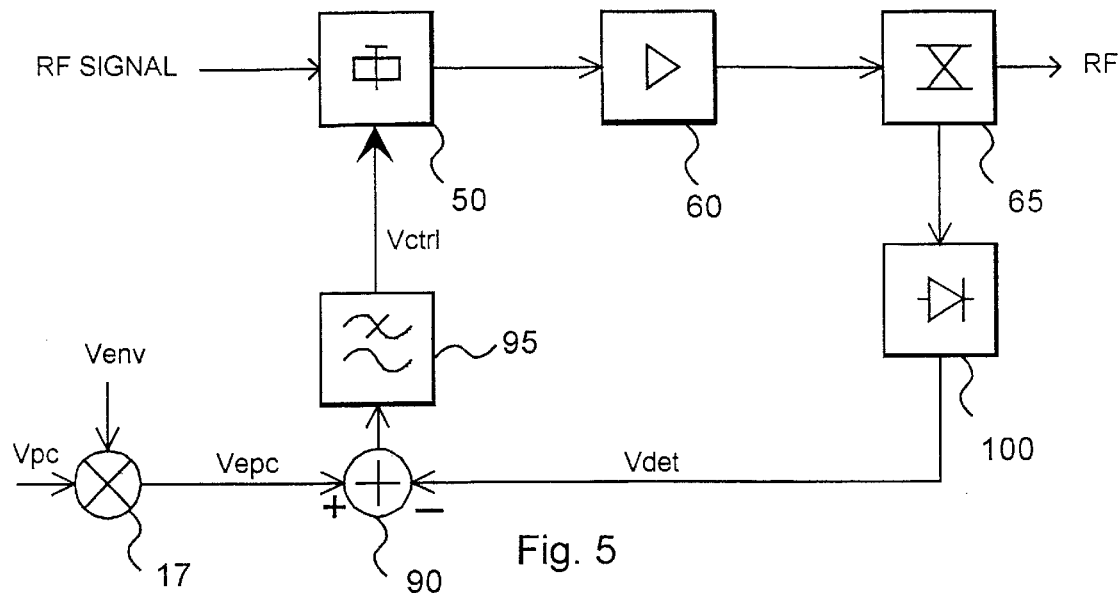
FIG. 5 shows the power control system in more detail.

FIG. 5 shows a power control system comprising a means 17, an attenuator means 50 receiving a modulated signal, a means 65, a means 90, a filter 95 and a means 100. The means 65 receives a signal from the amplifier means 60 and connects a signal that is proportional to the power level of the received signal to the means 100, which is in practice a power detector. The means 65 can be implemented by a directional coupler, for example. The output signal of the means 65 forms an RF output signal. The means 100 samples the signal detected by the means 65 and transmits a sample signal (Vdet) it has formed to the control means 90.

The means 17 receives a power control signal (Vpc) and an envelope signal (Venv) and it multiplies the received signals together. The result of the multiplication is a reference signal (Vepc) obtained from the output of the means 17 and supplied to the control means 90. The control means can be implemented, for example, by a differential amplifier. The differential inputs of the control means receive a reference signal and a sample signal. The control means forms an amplification control signal by an arithmetical operation corresponding to the difference between the reference signal and the sample signal. The control means connects the amplification control signal it has formed from the received signal to the filter 95, which is a low-pass filter. The filtered amplification control signal (Vctrl) is used to control the attenuation of the attenuator means 50. When the attenuation changes, the input signal of the amplifier 60 also changes, which leads to alterations in the output signal of the amplifier and in the RF signal.

Figure 6:
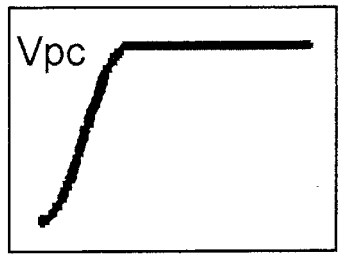
FIG. 6 shows a power control signal.
Figure 7:
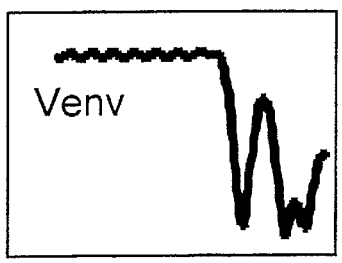
FIG. 7 shows an envelope signal.
Figure 8:
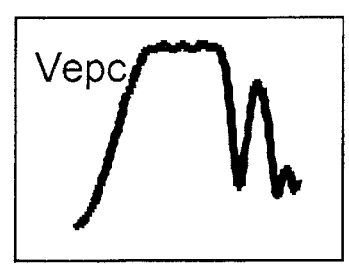
FIG. 8 shows a reference signal.
Figure 9:
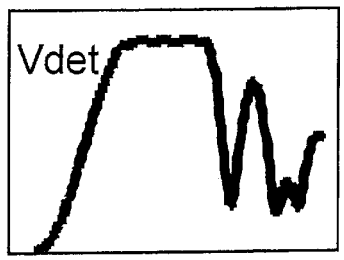
FIG. 9 shows a sample signal.
Figure 10:
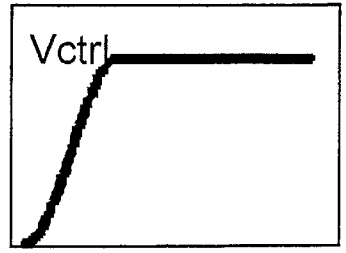
FIG. 10 shows an amplification control signal.

FIG. 6 shows the power control signal (Vpc) received by the means 17. FIG. 7 shows the envelope signal (Venv) received by the means 17. FIG. 8 shows the reference signal (Vepc) formed from the power control signal and the envelope signal. FIG. 9 shows the sample signal (Vdet) supplied from the means 100 to the means 90. FIG. 10 shows the amplification control signal (Vctrl) formed from the reference signal and the sample signal. The signals are shown as functions of time in FIGS. 6 to 10.

The control system according to the invention can be implemented by means of ASICs, for example, which provide a small control system and therefore a small transmitter. The power control method according to the invention is particularly suitable for transmitters utilizing linear modulation. Linear modulation refers to modulation where the modulated characteristic or envelope of the modulator's output signal is sufficiently linear on a particular level compared to the signal to be modulated. A transmitter utilizing the power control method according to the invention modulates a signal by means of, for example, 8-PSK or constant envelope modulation, such as GMSK modulation.

Even though the invention is described above with reference to an example according to the accompanying drawings, it is clear that the invention is not restricted thereto, but it can be modified in several ways within the scope of the inventive idea disclosed in the appended claims.

What is claimed is:

1. A power control method in a radio system where a modulated signal is transmitted to the radio path, transmission power of the signal to be transmitted is adjusted with an amplification control signal, the method comprising:

forming a reference signal, which follows the changes in the envelope of the modulated signal by multiplying a power control signal with an envelope signal, sampling the amplified signal to form a sample signal, and forming an amplification control signal from the reference signal and the sample signal, wherein forming the amplification control signal from the reference signal further comprises changing the amplitude of the reference signal in correspondence with changing the amplitude of the modulated signal.

2. A power control method in a radio system where a modulated signal is transmitted to the radio path, transmission power of the signal to be transmitted is adjusted with an amplification control signal, the method comprising:

forming a reference signal, which follows the changes in the envelope of the modulated signal by multiplying a power control signal with an envelope signal, sampling the amplified signal to form a sample signal, forming an amplification control signal from the reference signal and the sample signal, and adjusting the transmission power of the signal to be transmitted by a closed control loop.

3. The method according to claim 2, further comprising adjusting an average power of the signal to be transmitted such that the envelope of the modulated signal affects the amplitude of the reference signal.

4. The method according to claim 2, wherein changing the amplitude of the envelope of the modulated signal changes the amplitude of the reference signal.

5. The method according to claim 2, further comprising using the reference signal to compensate for a variation of the envelope that interferes with the modulation.

6. The method according to claim 2, further comprising forming a power control signal to adjust an average power of the signal to be transmitted, and forming a reference signal by multiplying together the envelope of the modulated signal and the power control signal.

7. The method according to claim 2, further comprising converting the modulated signal into an analog signal, and using signal values produced in the conversion to form an envelope.

8. A power control method in a radio system where a modulated signal is transmitted to the radio path, transmission power of the signal to be transmitted is adjusted with an amplification control signal, the method comprising:

forming a reference signal, which follows the changes in the envelope of the modulated signal by multiplying a power control signal with an envelope signal, sampling the amplified signal to form a sample signal, forming an amplification control signal from the reference signal and the sample signal, and forming an envelope digitally on a basis of bits to be transmitted.

9. A power control method in a radio system where a modulated signal is transmitted to the radio path, transmission power of the signal to be transmitted is adjusted with an amplification control signal, the method comprising:

forming a reference signal, which follows the changes in the envelope of the modulated signal by multiplying a power control signal with an envelope signal, sampling the amplified signal to form a sample signal, forming an amplification control signal from the reference signal and the sample signal, forming an amplification control signal from the reference signal and a sample signal formed from an amplified signal, and making a timing difference between the reference signal and the sample signal as short as possible.

10. A power control system in a transmitter of a radio system comprising:

an amplifier means, a modulation means which modulates a signal to be transmitted to a radio path, and a control means which forms an amplification control signal used to adjust the transmission power of the signal to be transmitted to the radio path, means for forming a reference signal following changes in an envelope of the modulated signal by multiplying a power control signal with an envelope signal, and means for sampling the amplified signal in order to form a sample signal, and the control means forms a control signal which adjusts amplification of the amplifier means from the reference signal and the sample signal, wherein the reference signal formed by the means for forming follows changes in the amplitude of the envelope.

11. A power control system in a transmitter of a radio system comprising:

an amplifier means, a modulation means which modulates a signal to be transmitted to a radio path, and a control means which forms an amplification control signal used to adjust the transmission power of the signal to be transmitted to the radio path, means for forming a reference signal following changes in an envelope of the modulated signal by multiplying a power control signal with an envelope signal, and means for sampling the amplified signal in order to form a sample signal, and the control means forms a control signal which adjusts amplification of the amplifier means from the reference signal and the sample signal, wherein the control system adjusts the transmission power of the transmitter by a closed control loop.

12. The control system according to claim 11, wherein the control means uses the reference signal to compensate for the variation of the envelope that interferes with the modulation.

13. The control system according to claim 11, wherein the control means receives a power control signal to adjust an average power of the signal to be transmitted.

14. The control system according to claim 11, wherein the means for forming receives a power control signal and another signal containing the envelope of the modulated signal, and the means for forming multiplies the signals together to form the reference signal.

15. The control system according to claim 11, wherein the control means forms a control signal from an analog reference signal and a sample signal of an output signal of the amplifier means.

16. A power control system in a transmitter of a radio system comprising:

an amplifier means, a modulation means which modulates a signal to be transmitted to a radio path, and a control means which forms an amplification control signal used to adjust the transmission power of the signal to be transmitted to the radio path, means for forming a reference signal following changes in an envelope of the modulated signal by multiplying a power control signal with an envelope signal, and means for sampling the amplified signal in order to form a sample signal, and the control means forms a control signal which adjusts amplification of the amplifier means from the reference signal and the sample signal, wherein the control system further comprises means for forming an envelope digitally on a basis of modulated bits.

17. A power control system in a transmitter of a radio system comprising:

an amplifier means, a modulation means which modulates a signal to be transmitted to a radio path, and a control means which forms an amplification control signal used to adjust the transmission power of the signal to be transmitted to the radio path, means for forming a reference signal following changes in an envelope of the modulated signal by multiplying a power control signal with an envelope signal, and means for sampling the amplified signal in order to form a sample signal, and the control means forms a control signal which adjusts amplification of the amplifier means from the reference signal and the sample signal, wherein the control system comprises means for compensating that makes the timing difference between the reference signal and the sample signal as short as possible through delay compensation.

* * * * *